May 26, 1953     D. H. BIERMAN ET AL     2,639,723
MULTIWAY VALVE
Filed Jan. 30, 1950     2 Sheets-Sheet 1
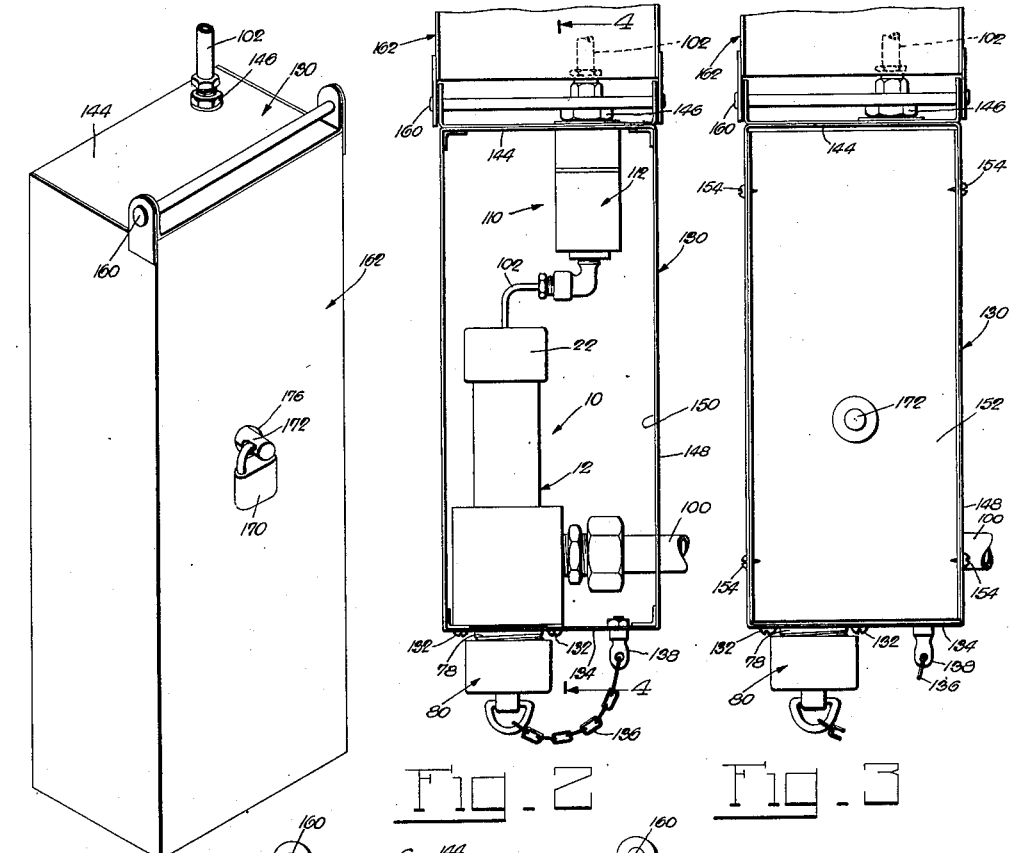
INVENTORS.
Daniel H. Bierman
Joseph A. Jawett
and Arthur D. Bierman
BY Edwin Leinohn &
Harry Cohen
Attorneys.

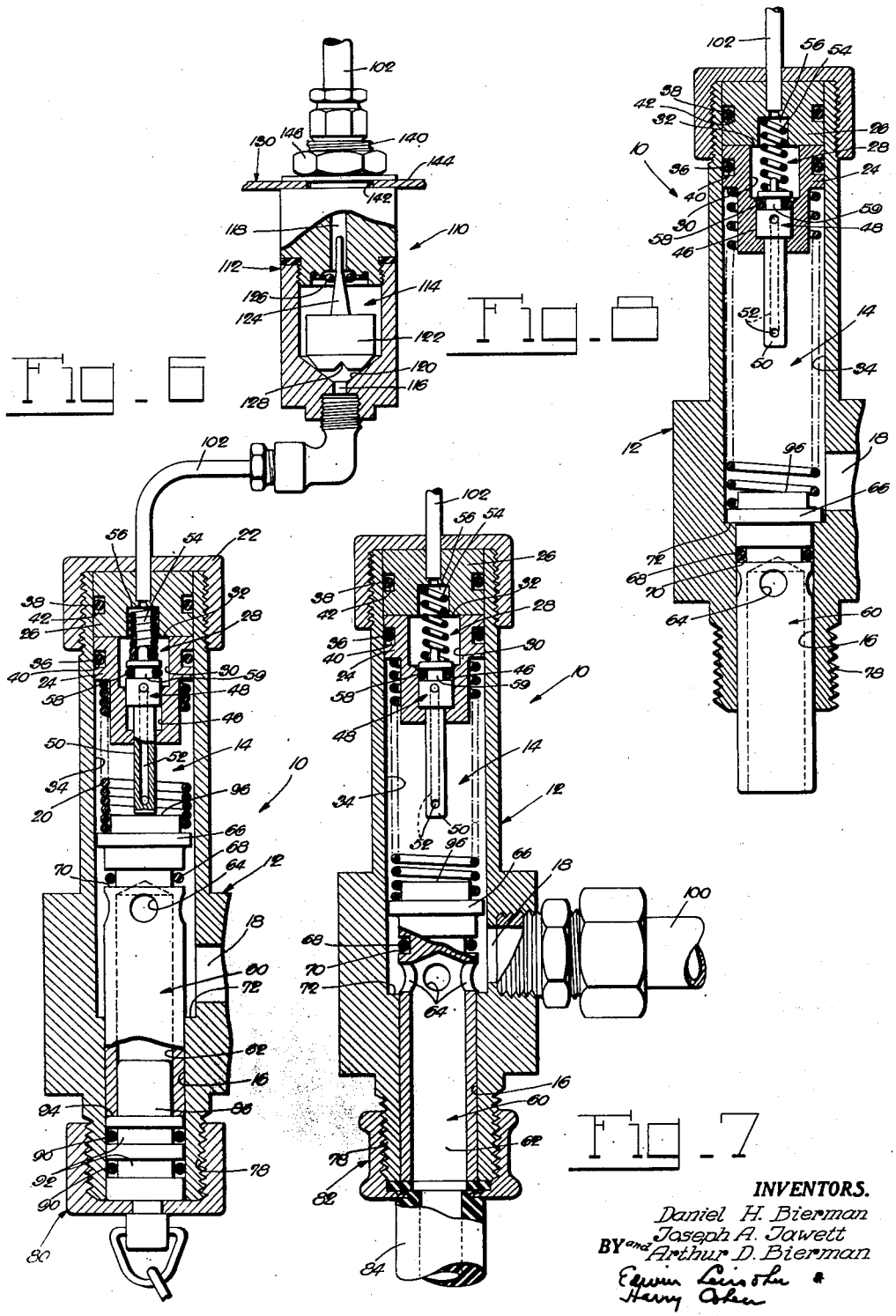

Patented May 26, 1953

2,639,723

UNITED STATES PATENT OFFICE 2,639,723

MULTIWAY VALVE

Daniel H. Bierman, Elmont, Joseph A. Jawett, Jamaica, and Arthur D. Bierman, Elmont, N. Y., assignors to Liquidepth Indicators Incorporated, Long Island City, N. Y., a corporation Application January 30, 1950, Serial No. 141,274

18 Claims. (Cl. 137—269)

This invention relates to multi-way valves, and more particularly to multi-way safety valves for use with liquid-holding tanks.

It is the primary object of the present invention to make provisions for the removal of any undesired residual liquid or liquids, such as condensation water, for instance, from a liquid fuel tank through the low-hanging air bell therein and a length of its air line which extends to an indicator that indicates the liquid depth in the tank by the hydrostatic pressure of the liquid at the air bell.

It is another object of the present invention to interpose in the air line of an indicator system of the above type a multi-way valve which is shiftable into positions to provide communication between the air bell and the indicator of the system, and between the air bell and a liquid outlet in the valve, respectively.

It is another object of the present invention to provide a multi-way valve for the above purpose which is normally effectively sealed at its liquid outlet, and which will as effectively seal the indicator of the system from the valve when the liquid outlet of the latter is opened for the removal of residual liquid or liquids from the tank.

It is another object of the present invention to provide a multi-way valve of this type with a removable sealing member at its liquid outlet, and to construct the valve so as to make communication therethrough between the air bell and indicator of the system dependent upon the firm closure of the sealing member at the liquid outlet of the valve.

It is another object of the present invention to construct the valve so that the liquid outlet thereof remains safely closed and communication through the valve between the air bell and indicator of the system will be interrupted on removal of the sealing member from the valve, and the liquid outlet will be opened only on connecting it with a hose or similar conduit through which to draw residual liquid or liquids from the tank.

It is another object of the present invention to provide a valve of this type which is simple and sturdy in construction and highly reliable in operation, and which may readily be disassembled and reassembled for the inspection, repair or replacement of parts.

It is another object of the present invention to provide a valve of this type which lends itself to ready installation in existing indicating systems of the above kind.

It is yet another object of the present invention to enclose the valve in a protective, readily mountable housing, and to provide the latter with a preferably lockable cover which in its closed position prevents unauthorized manipulation of the valve, and in its open position exposes and provides access only to the sealing member on the valve for its removal from the latter and connection of a hose or similar conduit with the liquid outlet of the valve, and for the removal of the hose from the valve and replacement of the sealing member on the latter.

The above and other objects, features and advantages of the present invention will be more fully understood from the following description considered in connection with the accompanying illustrative drawings.

In the drawings:

Fig. 1 is a perspective view of an enclosed multi-way valve embodying the present invention;

Fig. 2 is a front view of the open enclosure in which the valve is mounted;

Fig. 3 is a view similar to Fig. 2, showing an additional part in the open enclosure behind which the mounted valve is hidden;

Fig. 4 is a section taken on the line 4—4 of Fig. 2;

Fig. 5 is a fragmentary side elevation of the valve enclosure;

Fig. 6 is an enlarged section taken on the line 6—6 of Fig. 4; and

Figs. 7 and 8 are sections similar to Fig. 6, showing the valve in different positions.

Referring to the drawings, and more particularly to Figs. 2 and 6 thereof, the reference numeral 10 designates a valve which comprises a casing 12 in which is provided a main chamber 14 (Figs. 6 to 8) having an outlet 16 and being in communication with a port 18. Forced by a spring 20 against a cap screw 22 on the top end of the valve casing 12 are members 24 and 26 which are slidably received in the main chamber 14. Member 24 is provided with a bore 30 which, together with the adjacent bottom surface 32 of member 26, forms an auxiliary chamber 28. Both members 24 and 26 are in sealing engagement with the presently cylindrical wall 34 of the main chamber 14, preferably through intermediation of packing rings 36 and 38 of rubber or the like in peripheral grooves 40 and 42 in the members 24 and 26, respectively. The bore 30 in the member 24 is, in the present instance, diametrically reduced at 46 for the sliding reception of a valve member 48, having a shank 50 which projects into the main chamber 14. Valve member 48 is provided with a duct 52 for providing communication between the main and auxiliary chambers 14 and 28, respectively, when said valve member 48 assumes the position shown in Fig. 6. Valve member 48 is normally urged into the closed position shown in Figs. 7 and 8 by a compression spring 54 which is preferably seated in a central recess 56 in the member 26. The duct 52 in the valve member 48 is, in the closed position of the latter (Figs. 7 and 8), effectively sealed from the auxiliary chamber 28 by a packing ring 58 in a peripheral groove 59 in said valve member 48.

Slidably received in the preferably cylindrical machined outlet 16 of the valve casing 12 is a plunger-type valve member 60 having an axial passage 62 and a plurality of lateral ducts 64 in communication therewith. The spring 20, which as previously mentioned bears with one end against the member 24, bears with its other end against a collar 66 on the valve member 60 and forces the latter into the closed position shown in Fig. 8, in which its passage 62 and ducts 74 are effectively sealed from the main chamber 14 in the valve casing 12, preferably by a packing ring 68 in a peripheral groove 70 in the valve member 60. When in its closed position, the valve member 60 bears with its collar 66 against an annular shoulder 72 in the valve casing 12 (Fig. 8).

The lower end of the valve casing 12 is externally threaded at 78 for the reception of a cap screw 80 (Fig. 6), or for the reception of a conventional union 82 on a hose or other circuit 84 (Fig. 7). As will appear hereinafter, the instant valve 10 is normally closed at its lower end by the cap screw 80 which, in the present instance, is provided with an axially projecting stem 86 that extends into the outlet 16 of the valve casing 12 when the cap screw 80 is mounted on the valve casing 12 as shown in Fig. 6. The stem 86 of the cap screw 80 is in sealing engagement with the outlet 16 of the valve casing 12, preferably through intermediation of packing rings 90 in peripheral grooves 92 in said stem 86.

When securing the cap screw 80 to the threaded end 78 of the valve casing 12, the stem 86 on said cap screw, and more particularly an annular shoulder 94 thereon, forces the valve member 60 into the position shown in Fig. 6 in which its top end 96 engages the shank 50 of the valve member 48 and lifts the latter into the open position shown in Fig. 6, against the tendency of the spring 54 to close valve member 48. On removing the cap screw 80 from the threaded end 78 of the valve casing 12, for a purpose hereinafter described, both valve members 48 and 60 will be forced by their respective springs 54 and 20 into their closed positions (Fig. 8) in which valve member 60 projects beyond the valve casing 12. As will appear hereinafter, the hose is at times connected with the threaded end 78 of the valve casing 12. To this end, the valve member 60 is, by the union 82 on the connected hose 84, forced into the "open" position shown in Fig. 7 in which the hose 84 is in communication with the main chamber 14 in the valve casing 12 through the passage 62 and ducts 64 in the valve member 60. Valve member 60 is in its open position (Fig. 7), spaced from the shank 50 of valve member 48 so that the latter remains in its closed position. The springs 20 and 54 are so selected that spring 20 will overpower spring 54 in any position of the valve member 60, with the result that the members 24 and 26 will at all times be held securely against the cap screw 22.

The instant valve 10, while useful for many purposes, is used with particular advantage in a tank-contents measuring system such as that shown and described in the co-pending application of Daniel H. Bierman, Serial No. 23,517, filed April 27, 1948. Such a system provides in a liquid-holding tank, near the bottom thereof, an air bell which through a suitable air line is in communication with an air-pressure indicator, such as a mercury tube, for instance. In such a system, the hydrostatic pressure of the liquid at the air bell in the tank is indicated by the level of the mercury column in the indicator tube which is read against a scale the graduations of which have preferably been computed in units denoting liquid depth in the tank rather than hydrostatic pressure, thus affording a direct reading of the liquid contents of the tank at any time. For use of the instant valve 10 in an indicator system of this kind, the former is interposed in the air line of the indicator system. To this end, the port 18 in the valve casing 12 is in communication with the air bell in the tank through a conduit 100 which forms a part of the air line of the indicator system. To the same end, the auxiliary chamber 28 in the valve casing 12 is in communication with the air-pressure indicator of the system through a conduit 102 which constitutes the remainder of the air line of the system. Thus, the cap screw 80 is, in normal usage of the valve 10, secured to the lower end of the valve casing 12, with the result that the valve members 60 and 48 assume the respective positions shown in Fig. 6, in which valve member 48 is open and provides communication between the air bell and air-pressure indicator of the system.

By the provision of the valve member 60 and of the threaded end 78 on the valve casing 12, the instant valve 10 may also be used to good advantage for drawing from the tank, with which it is connected through the conduit 100, any undesired residual liquid or liquids, such as condensation water, for instance. Thus, on applying the union 82 of the hose 84 to the threaded end 78 of the valve casing 12, valve member 60 is shifted by the union 82 into its open position (Fig. 7) while the valve member 48 remains closed, with the result that the auxiliary chamber 28 and, hence, also the air-pressure indicator of the system are sealed from the main chamber 14 in the valve, and the air bell in the tank is, through intermediation of the conduit 100 and valve member 60 in valve 10, in communication with the hose 84 that may be connected with any suitable pump, for instance. Since the air bell is usually arranged relatively close to the bottom of the tank, it stands to reason that most of the residual liquid in the tank may be drawn therefrom through the air bell, conduit 100, valve 10 and connectible hose 84.

To connect the hose 84 with the instant valve 10, the cap screw 80 will first have to be removed from the valve casing 12, thereby permitting the valve member 60 to be shifted by the spring 20 into the projected position shown in Fig. 8, in which the same effectively seals the outlet 16 in the valve casing 12 from the main chamber 14 therein. Thus, on removal of the cap screw 80 from the valve casing 12, both valve members 60 and 48 are in their closed position. This is particularly advantageous in the case of tanks holding inflammable liquids, such as gasoline, for instance, in that the instant valve 10 neither provides access to the interior of the tank or any of the parts in open communication therewith, nor offers an escape passage for liquid from the tank, under any conditions, except through the hose 84 when connected with the valve in the safe manner shown in Fig. 7. Thus, valve 10 is particularly safe and fool proof because its main chamber 14 is inaccessible from the outside of the valve casing 12, except through the connected hose 84.

To prevent liquid from the tank to enter the air line 102 of the system under any and all circumstances, there is interposed in the latter a check-type valve 110 (Fig. 6) which comprises a valve casing 112 having a chamber 114 and inlet and outlet ports 116 and 118, respectively. The bottom of the chamber 114 is preferably formed frusto-conical to form a seat 120 for a float valve 122 of any suitable material, such as cork, for instance. Valve member 122 is provided with a frusto-conical stem 124 which extends through a sealing ring 126 at the outlet port 118. The bottom of the valve 122 is preferably notched at 128 to serve as a passage for air from the inlet port 116 into the chamber 114 when said valve 122 rests on its seat 120 (Fig. 6). If any liquid should ever reach the valve 122, the latter will rise with the liquid into position in which its stem 124 will close the outlet port 118 at the sealing ring 126 and prevent the liquid from flowing therebeyond to the air-pressure indicator of the system.

The valve 10 is preferably mounted in a housing 130 (Figs. 1 to 5) which itself may suitably be mounted on any upright support (not shown) where it is conveniently accessible. The valve 10 may conveniently be mounted in the housing 130 by screws 132, for instance, and projects with its threaded end 78 to the outside of the housing through the bottom wall 134 thereof. In order to prevent misplacement of the cap screw 80 when removed from the valve casing 12, the former is preferably anchored to the housing 130 through intermediation of a chain 136 and an anchor post 138, for instance (Fig. 2). The check valve 110 may also conveniently be mounted in the housing 130. To this end, the valve casing 112 may be provided with a threaded shank 140 (see also Fig. 6) which extends through an aperture 142 in the top wall 144 of the housing 130 and receives a nut 146. The conduit 100 may extend through an opening 147 in the side wall 148 of the housing 130 (Fig. 5). The housing 130 is open at its front as at 150, and is normally closed thereat by a removable cover plate 152. The cover plate 152 is, in the present instance, channel-shaped and may conveniently be mounted in the housing 130 by screws 154, for instance. Suitably hinged at 160 on top of the housing 130 is a cover 162 which is open at the top and back thereof as best shown in Fig. 4. The cover 162 extends in its closed position beneath the mounted cap screw 80 so as to prevent unauthorized manipulation of the same (Fig. 4). To permit closure of the cover 162, the side wall 163 of the latter is slotted at 166 (Fig. 5) to clear the conduit 100. Preferably, the cover 162 is normally locked in its closed position by a Yale lock 170, for instance, which is applied to a stud 172 that is securely anchored at 174 on the cover plate 152 and projects through an aperture 176 in the closed cover 162 (Figs. 1 and 4). Thus, only an authorized person having a key for the lock 170 may open the cover 162 for access to the valve 10.

Referring again to the specific construction of the instant valve 10, with particular reference to Figs. 6 to 8, inclusive, it will be noted that valve 10 is of extremely simple, yet sturdy construction, and may readily be disassembled for the inspection, repair or replacement of the parts therein, and may as readily be reassembled without requiring any special skill. Thus, it is merely necessary to remove the cap screw 22 from the valve casing 12 for the removal from the latter of all the parts therein. In this connection, it will be further noted that, on removal of the cap screw 22 from the valve casing 12, the preloaded spring 20 will eject from the latter all the parts therein, with the exception of the valve member 60, and the latter may readily be removed through the top end of the valve casing 12. The assembly of the parts in the valve casing 12 is equally simple, as will be readily understood.

While we have shown and described the preferred embodiment of our invention, it will be understood that various changes may be made in the present invention without departing from the underlying idea or principles of the invention within the scope of the appended claims.

Having thus described our invention, what we claim and desire to secure by Letters Patent, is:

1. A tank contents indicating system comprising an air bell in a vented liquid tank near the bottom thereof and an air line connecting the air bell with an air pressure indicator outside the tank, a valve in said air line having an outlet and provisions for releasably mounting a conduit in communication with said outlet, said valve having a member shiftable relative to said outlet into positions in which to provide communication between the air bell and indicator and between the air bell and said outlet, respectively, and coupling means formed complementary to said mounting provisions, said valve member being shiftable in response to the cooperative association of said coupling means and said valve member.

2. A tank contents indicating system comprising an air bell in a vented liquid tank near the bottom thereof and an air line connecting the air bell with an air pressure indicator outside the tank, a valve in said air line, said valve having an outlet and a valve member shiftable into positions relative to said outlet in which to provide communication between the air bell and indicator, to intercept communication between the air bell, indicator and valve outlet, and to provide communication between the air bell and valve outlet, respectively, and coupling means formed complementary to said mounting provisions, said valve member being shiftable in response to the cooperative association of said coupling means and said valve member.

3. A multi-way valve, comprising a valve casing having a chamber, and first, second and third ports each providing communication between said chamber and the outside of said casing, a first valve member in said casing normally urged into a first position, and shiftable into a second position, in which to intercept and provide communication, respectively, between said first and second ports, a second valve member in said casing normally urged into a first position in which to intercept communication between said first and third ports, and shiftable into other positions in each of which to provide communication between said first and third ports, said second valve member, when in one of said other positions thereof, holding said first valve member in said second position thereof, and an element removably mountable on said casing in sealing relation with said third port, said element, when mounted, holding said second valve member in said one position thereof.

4. A multi-way valve as set forth in claim 3, in which said element is externally mountable on said casing and has a portion extending into said third port to engage and hold said second valve member in said one position thereof.

5. A multi-way valve as set forth in claim 3, in which said element is externally mountable on said casing and has a portion extending into said third port in sealing relation therewith and engaging and holding said second valve member in said one position thereof.

6. A multi-way valve adapted for releasable connection with a conduit through a union element thereon, comprising a valve casing having a chamber, first, second and third ports each providing communication between said chamber and the outside of said casing, and provisions for the releasable attachment to said casing of said union element with the conduit thereof in communication with said third port, a first valve member in said casing normally urged into a first position, and shiftable into a second position, in which to intercept and provide communication, respectively, between said first and second ports, a second valve member in said casing normally urged into a first position in which to intercept communication between said first and third ports, and shiftable into second and third positions in each of which to provide communication between said first and third ports, said second valve member, when in said third position, holding said first valve member in said second position thereof, and being shifted into said second position by the union element when attached to said casing.

7. A multi-way valve, comprising a valve casing having a main chamber, a side inlet, and outlets at the opposite ends, respectively, of said casing, an element slidable in said main chamber in sealing relation therewith and forming with one of said casing ends an auxiliary chamber with which one of said outlets communicates, a normally closed first valve member in said element having a shank projecting into said main chamber and being liftable into said auxiliary chamber into open position therein in which to provide communication between said chambers, a second valve member slidable in said casing into a first position in which to intercept communication between said inlet and other outlet, and also slidable into other positions in each of which to provide communication between said inlet and other outlet, a compression spring interposed in said main chamber between said element and second valve member and urging the latter into said first position and the former against said one casing end into auxiliary chamber-forming relation therewith, said second valve member, when in one of said other positions thereof, engaging the shank of said first valve member and holding the latter in its open position, and another element removably mountable on said casing in sealing relation with said other outlet thereof, said other element, when mounted, holding said second valve member in said one position thereof against the tendency of said spring to force it into said first position thereof.

8. A multi-way valve as set forth in claim 7, in which said first valve member is normally closed by another compression spring interposed in said auxiliary chamber between said first valve member and adjacent casing end, said other spring being in any position of said first valve member weaker than the spring in said main chamber in any position of said second valve member.

9. A multi-way valve as set forth in claim 7, in which said second valve member is of the sleeve-type and slidable in said other outlet, and said second valve member projects in said first position thereof to the outside of said casing and is movable inwardly of said casing into said other positions thereof.

10. A multi-way valve as set forth in claim 7, in which said one end of the casing is open and normally closed by a removable cover, and said second valve member projects in said first position thereof through said other outlet to the outside of said casing, and said second valve member is movable inwardly of said casing into said other positions thereof and is provided with a stop internally engaging said casing when said second valve member is in said first position to prevent outward movement of the latter beyond said first position.

11. A multi-way valve adapted for releasable connection with a conduit through a union therein, comprising a valve casing having a main chamber, a side inlet, and outlets at the opposite ends, respectively, of said casing, an element slidable in said main chamber in sealing relation therewith and forming with one of said casing ends an auxiliary chamber with which one of said outlets communicates, a normally closed first valve member in said element having a shank projecting into said main chamber and being liftable into said auxiliary chamber into open position therein in which to provide communication between said chambers, a second sleeve-type valve member having a stop and being slidable in the other of said outlets into a first position in which to intercept communication between said inlet and other outlet and being also slidable into other positions in each of which to provide communication between said inlet and other outlet, said second valve member, when in said first position thereof, projecting to the outside of said casing and internally engaging the latter with said stop to prevent further outward movement of said second valve member, and the latter being shiftable inwardly of said casing into said other positions thereof, a compression spring interposed in said main chamber between said element and second valve member and urging the latter into said first position and the former against said one casing end into auxiliary chamber-forming relation therewith, said second valve member, when in the innermost of said other positions thereof, engaging the shank of said first valve member and holding the latter in its open position, said casing having provisions for the releasable attachment thereto of the union with the conduit thereof in communication with said other outlet, and the attached union holding said second valve member in another one of said other positions thereof.

12. A multi-way valve as set forth in claim 11, in which said provisions comprise external threads on the other casing end through which said other outlet extends.

13. A multi-way valve as set forth in claim 11, in which said first valve member is normally closed by another compression spring interposed in said auxiliary chamber between said first valve member and adjacent casing end, said other spring being in any position of said first valve member weaker than the spring in said main chamber in any position of said second valve member.

14. A multi-way valve adapted for releasable connection with a conduit through a union element thereon, comprising a valve casing having a chamber, first, second and third parts each providing communication between said chamber and the outside of said casing, and provisions for the releasable attachment to said casing of the union element with the conduit thereof in communication with said third port, a first valve member in said casing normally urged into a first position, and shiftable into a second position, in which to intercept and provide communication, respectively, between said first and second ports, a second valve member in said casing normally urged into a first position in which to intercept communication between said first and third ports, and shiftable into second and third positions in each of which to provide communication between said first and third ports, said second valve member, when in said third position, holding said first valve member in said second position thereof, and being shifted into said second position by the union element when attached to said casing, a housing in which said valve casing is mounted with said attachment provision thereof exposed on the outside of said housing, and a cover carried by said housing for movement thereon into open and closed positions in which to expose and cover, respectively, said attachment provision and said union element, said housing being provided with apertures through which to pass conduits to said first and second ports.

15. A multi-way valve, comprising a valve casing having a chamber, and first, second and third ports each providing communication between said chamber and the outside of said casing, a first valve member in said casing normally urged into a first position, and shiftable into a second position, in which to intercept and provide communication, respectively, between said first and second ports, a second valve member in said casing normally urged into a first position in which to intercept communication between said first and third ports, and shiftable into other positions in each of which to provide communication between said first and third ports, and said second valve member, when in one of said other positions thereof, holding said first valve member in said second position thereof, and means for shifting said second valve member into said other positions.

16. A multi-way valve, comprising a valve casing having a chamber, first, second, and third ports each providing communication between said chamber and the outside of said casing, an element associated with said third port, and provisions for the releasable attachment to said third port of said casing of said element, a first valve member in said casing normally urged into a first position, and shiftable into a second position, in which to intercept and provide communication, respectively, between said first and second ports, a second valve member in said casing normally urged into a first position in which to intercept communication between said first and third ports, and shiftable into second and third positions in each of which to provide communication between said first and third ports, and said second valve member, when in said third position, holding said first valve member in said second position thereof, said element being cooperatively associated with said second valve member for shifting the latter.

17. A multi-way valve, comprising a valve casing having a main chamber, a side inlet, and outlets at the opposite ends, respectively, of said casing, an element slidable in said main chamber in sealing relation therewith and forming with one of said casing ends an auxiliary chamber with which one of said outlets communicates, a normally closed first valve member in said element having a shank projecting into said main chamber and being liftable into said auxiliary chamber into open position therein in which to provide communication between said chambers, a second valve member slidable in said casing into a first position in which to intercept communication between said inlet and other outlet, and also slidable into other positions in each of which to provide communication between said inlet and other outlet, a compression spring interposed in said main chamber between said element and second valve member and urging the latter into said first position and the former against said one casing end into auxiliary chamber-forming relation therewith, said second valve member, when in one of said other positions thereof, engaging the shank of said first valve member and holding the latter in its open position, and another element removably mounted on said other outlet of said casing, said last mentioned element having means for sliding said second valve member into said other positions thereof.

18. A multi-way valve adapted for releasable connection with an element, comprising a valve casing having a main chamber, a side inlet, and outlets at the opposite ends, respectively, of said casing, another element slidable in said main chamber in sealing relation therewith and forming with one of said casing ends an auxiliary chamber with which one of said outlets communicates, a normally closed first valve member in said another element having a shank projecting into said main chamber and being liftable into said auxiliary chamber into open position therein in which to provide communication between said chambers, a second sleeve-type valve member having a stop and being slidable in the other of said outlets into a first position in which to intercept communication between said inlet and other outlet and being also slidable into other positions in each of which to provide communication between said inlet and other outlet, said second valve member, when in said first position thereof, projecting to the outside of said casing and internally engaging the latter with said stop to prevent further outward movement of said second valve member, and the latter being shiftable inwardly of said casing into said other positions thereof, a compression spring interposed in said main chamber between said another element and second valve member and urging the latter into said first position and the former against said one casing end into auxiliary chamber-forming relation therewith, said second valve member, when in the innermost of said other positions thereof, engaging the shank of said first valve member and holding the latter in its open position, said casing having provisions for the releasable attachment thereto of said element, and said element having means adapted to cooperate with said second valve member for shifting the latter.

DANIEL H. BIERMAN.
JOSEPH A. JAWETT.
ARTHUR D. BIERMAN.

References Cited in the file of this patent
UNITED STATES PATENTS

| Number | Name | Date |
| --- | --- | --- |
| 941,760 | Cordley | Nov. 30, 1909 |
| 998,843 | Dunn | July 25, 1911 |
| 1,475,252 | Swanjord | Nov. 27, 1923 |
| 1,585,084 | Cunningham | May 18, 1926 |
| 1,834,033 | Michelin | Dec. 1, 1931 |
| 2,179,750 | McCracken | Nov. 14, 1939 |
| 2,333,060 | Turner | Oct. 26, 1943 |
| 2,501,706 | Bent | Mar. 28, 1950 |